UNITED STATES PATENT OFFICE.

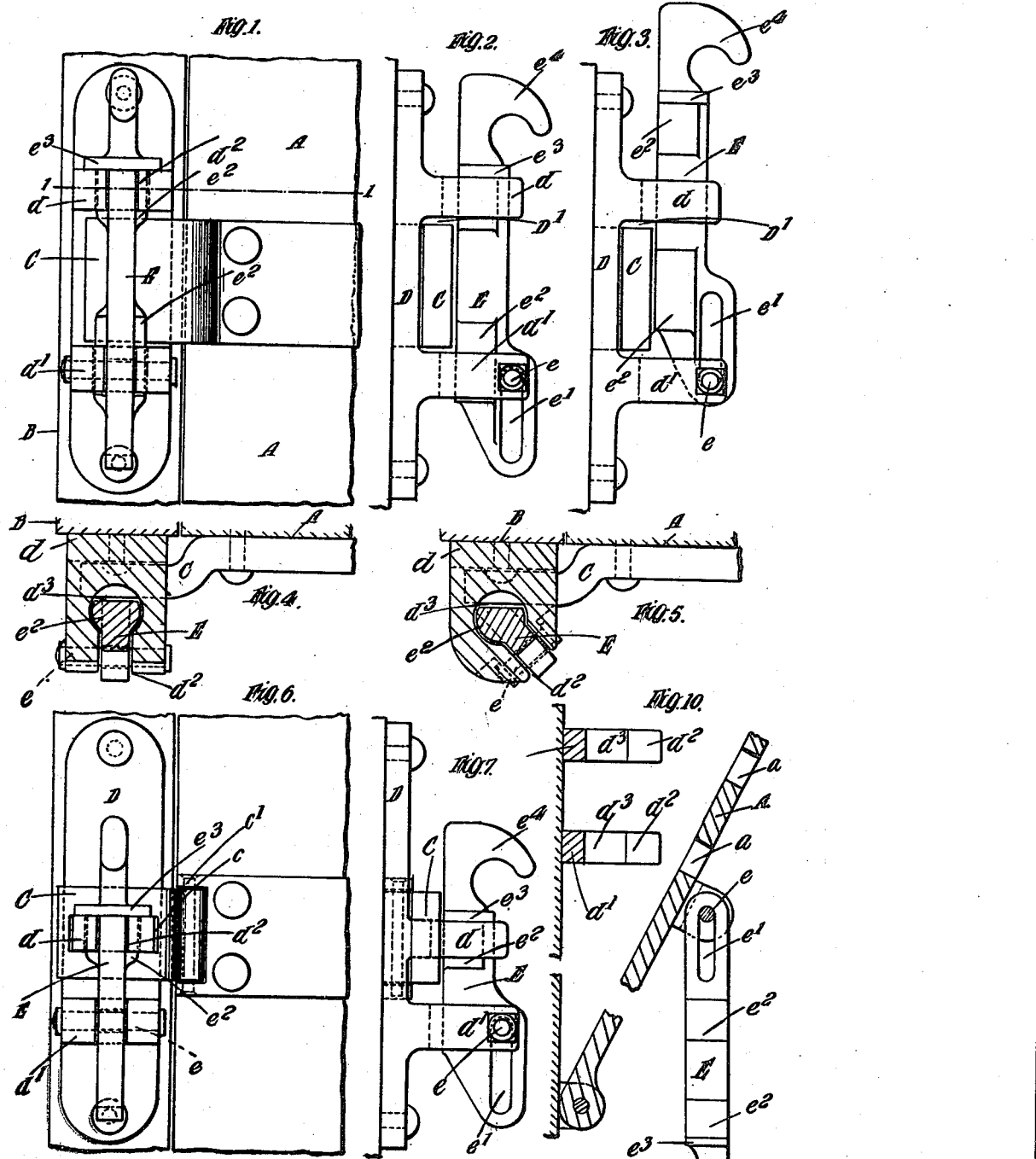

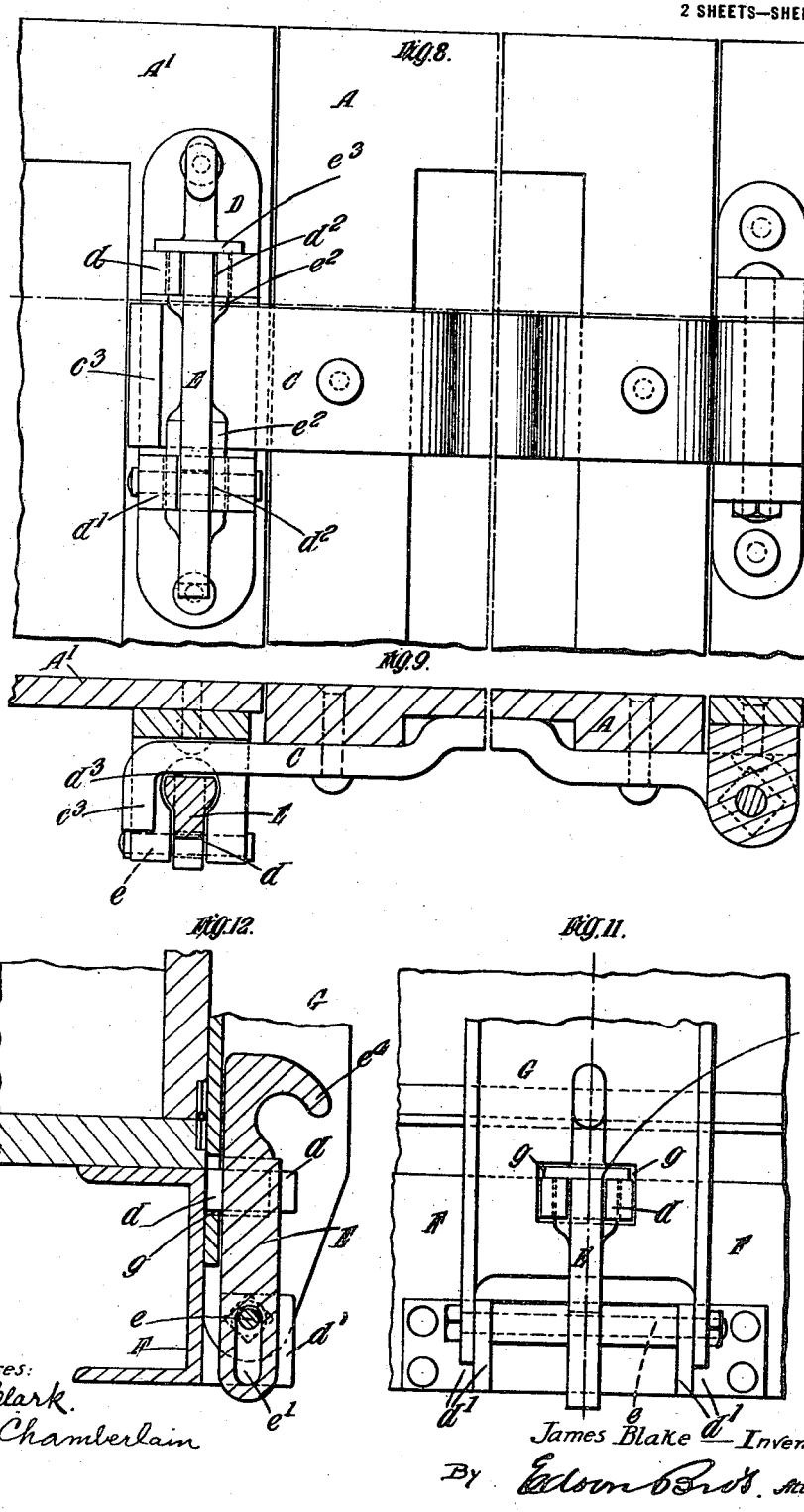

JAMES BLAKE, OF DARLINGTON, ENGLAND.

FASTENING DEVICE FOR USE WITH DOORS AND THE LIKE.

1,195,331.  Specification of Letters Patent.  Patented Aug. 22, 1916.

Application filed November 10, 1914. Serial No. 871,424.

*To all whom it may concern:*

Be it known that I, JAMES BLAKE, a subject of the King of Great Britain, residing at Leconfield, Abbey Road, Darlington, in the county of Durham, England, have invented certain new and useful Improvements in or Relating to Fastening Devices for Use with Doors and the like, of which the following is a specification.

This invention relates to fastening devices for securing doors and the like in their closed position and relates more particularly to fastening devices for use with the hinged doors or sides of railway and other cars for securing them in their closed position, the said fastening devices being of the kind that are provided with bolts or the like having pin and slot connections for enabling them to be moved into or out of their operative position relatively to sockets by longitudinal and angular movements.

According to my invention I so construct and arrange a fastening device of the above stated kind that it retains the door closed by holding a portion of the door or a projection thereon between the socket or the socket support and the bolt. For this purpose the socket is formed with a gap between its ends for the reception of the said projection on the door the gap being bridged by a bolt when the latter occupies its retaining position. The said socket comprises two slotted lugs situated one above the other at a suitable distance apart to form the aforesaid gap and the bolt is connected with the lower lug by the pin and slot arrangement which permits the bolt to perform the aforesaid longitudinal and angular movements. The outer ends of the slots in the lugs are open and their inner ends are enlarged to form cavities of greater width than the slots for the reception of corresponding enlargements on the bolt. These enlargements are so situated that when the bolt is lifted longitudinally to the extent permitted by the pin and slot arrangement, they become disengaged from the enlarged portions of the slots in the lugs and permit the bolt to be turned outwardly about its pin. The projection on the door lying in the gap is thus released so that the door can be opened. When the bolt is turned inwardly again and permitted to descend, these enlargements reengage with the enlarged portions of the slots in the lugs and thus hold the bolt firmly in its retaining position.

In order that the said invention may be clearly understood and readily carried into effect I will now proceed to describe the same more fully with reference to the accompanying drawings in which—

Figure 1 shows in front elevation my improved fastening device intended for use with a railway car the bolt of the fastening device being in the retaining position. Figs. 2 and 3 are side elevations showing the bolt respectively in its engaged and disengaged position. Fig. 4 is a horizontal section on the line 1 1 of Fig. 1. Fig. 5 shows a similar view illustrating a slightly modified arrangement of the fastening device. Figs. 6 and 7 are similar views to Figs. 1 and 2 but show another modification of the fastening device. Figs. 8 and 9 are a side elevation and a longitudinal section showing a form of the fastening device suitable for use with double doors turning about vertical hinges. Fig. 10 is a sectional side elevation showing another modification of the fastening device. Fig. 11 is a front elevation and Fig. 12 a vertical section showing a modified arrangement of the fastening device suitable for retaining the hinged sides of a car in their closed position.

Like letters of reference are used to indicate similar parts in all the figures.

Referring first more particularly to Figs. 1 to 4, A represents the door and B a fixed upright or stanchion of a car. C is the hasp with which the door is provided for engagement with the socket D. E is the bolt of the fastening device which bolt is connected to the socket by the pin $e$ which passes through the slot $e'$ in the lower end of the bolt so that the said bolt is capable of being moved longitudinally and angularly as aforesaid. The said socket D is formed with the gap D' formed by the two lugs $d\ d'$ which are arranged one above the other at a suitable distance apart to allow the hasp C on the door to occupy a position between them when the said door is closed, the said bolt E being adapted to bridge the gap D' when moved into its retaining position as shown in Fig. 1. Each of the said lugs $d\ d'$ is formed with a slot which is open at its outer end $d^2$ and has at its inner end a cylindrical cavity $d^3$ which is of greater width than the outer end of the slot $d^2$. The bolt E is formed with the two enlargements $e^2$ $e^2$ which are adapted to engage with the cylindrical cavities $d^3$ and are so situated that when the bolt is lifted to the extent permitted by the pin and slot arrangement, they become disengaged from the cavities and permit the bolt to be turned outward and downward about its pin so that the hasp C on the door lying in the gap D is released and the door rendered free to open. When the bolt E is turned inwardly again and permitted to descend the enlargements $e^2$ reengage with the cavities $d^3$ and thus hold the bolt firmly in its retaining position as shown in Figs. 1 and 2.

In order that the pin $e$ forming part of the pin and slot arrangement shall not be subjected to shearing stresses in a downward direction when the bolt is in its retaining position one of the enlargements is formed with the shoulder $e^3$ which rests upon the lug $d$ when the bolt is in its retaining position. The upper or free end of the bolt may be formed with a hooked portion $e^4$ to permit of its being readily manipulated.

In some cases the bolt may be arranged to turn in a plane at an angle to the door instead of in a plane at right angles thereto, the slotted lugs and the pin about which the bolt turns being suitably disposed to permit of this. Such an arrangement is shown by Fig. 5.

Fig. 6 shows a modification in which the socket comprises only one locking lug for the reception of the bolt the other lug serving as a bracket for carrying the pin $e$ about which the bolt is displaced. In this case the door hasp C is formed with a slot $c$ to pass over the said locking lug and may be advantageously hinged at $c'$ so as to enable it to be readily turned into or out of position over the said locking lug, it being understood that the bolt C would in this case be formed with only one enlargement $e^2$ to engage the cylindrical cavity in the locking lug; this enlargement may also be formed with a shoulder $e^3$ to rest upon the locking lug when the bolt is in its retaining position for a similar purpose to that above stated with respect to the arrangement illustrated by Figs. 1 to 4.

Figs. 8 and 9 show the form of device which is intended for use with double doors turning about vertical hinges, in which case the bolt E and its socket D may be of the kind described in connection with Figs. 1 to 4 the said bolt and socket being situated on one of the doors and the projection C on the other door; the free end of this projection is curved or otherwise constructed to form a lip $c^3$ which lies at the side of the bolt remote from the meeting edges, of the doors (see Fig. 9) and serves to prevent the hasp sliding from behind the bolt E.

Fig. 10 shows a form of the fastening device in which the bolt E together with its pin and slot arrangement is mounted on the door, the slotted lugs $d$ $d$ being mounted upon the stationary uprights or other convenient part of the vehicle. The door is in this case formed with slots or apertures $a$ $a$ through which the slotted lugs project when the door is closed, so that the bolt E can then be engaged with the lugs in an analogous manner to that previously described with reference to Figs. 1 to 4. Obviously with this arrangement only one lug need be employed for maintaining the bolt in its retaining position if desired in which case the door would be provided with only one slot and the arrangement would then be similar to that shown by Figs. 6 and 7.

Figs. 11 and 12 show a modified arrangement of the fastening device which is more particularly intended for use with a vehicle having hinged sides and in this case the said bolt and its socket are similar to those shown by Figs. 6 and 7 the upper lug $d$ of the socket being carried by the longitudinal beam F forming part of the underframe of the vehicle; this beam also carries the lower lug $d$ for the pin $e$ about which the bolt E turns. Instead of providing the hinged side of the vehicle with a fixed projection thereon for engagement with the upper lug $d$ the said projection is in the form of a hinged member G preferably comprised of a channel iron having a slot $g$ therein for engagement with the upper lug $d$. This member is pivotally mounted on the hinge pin $e$ of the bolt E so that it is capable of being turned about said pin in order to assume its engaging and disengaging positions relatively to the hinged side of the vehicle, that is to say when it is turned into an upright position as shown in the drawing it lies in contact with the adjacent hinged side of the vehicle and is retained by the bolt E, engaging with the upper lug $d$ which projects through the slot $g$.

What I claim and desire to secure by Letters Patent of the United States is:—

1. A door fastening device consisting in the combination of a lug having an open ended slot of varying width, a bolt, means for supporting the bolt so as to allow it to turn and slide, an enlargement on said bolt near its free end adapted to engage with the slot in said lug, and a portion appertaining to the door adapted to lie between the base of the lug and the bolt.

2. A door fastening device consisting in the combination of a plurality of lugs with a gap between them, one of said lugs having in it an open ended slot of varying width, a hinged and sliding bolt adapted to bridge the gap between the lugs, an enlargement on said bolt adapted to engage with the slot in the slotted lug and a portion appertaining to the door adapted to lie in the gap between the lugs bridged by the bolt.

3. A door fastening device consisting in the combination of two lugs with a gap between them each having an open ended slot of varying width, a hinged and sliding bolt adapted to bridge the gap between the lugs, enlargements on said bolt adapted to engage with the slots in the lugs and a portion appertaining to the door adapted to lie in the gap between the lugs bridged by the bolt.

4. A door fastening device consisting in the combination of two lugs with a gap between them each having an open ended slot of varying width, a bolt adapted to bridge the gap between the lugs, a hinge pin carried by one of the lugs and extending through a slot in the adjacent end of the bolt so that it is capable of hinging and sliding movement, enlargements on said bolt adapted to engage with the slots in said lugs, a portion appertaining to the door adapted to lie in the gap between the lugs bridged by the bolt, and a shoulder on the bolt adapted to rest against one of the lugs when said bolt is in its locking position.

5. A door fastening device consisting in the combination of two lugs with a gap between them each having an open ended slot of varying width, a bolt adapted to bridge the gap between the lugs, a hinge pin connected to one of said lugs and extending through a slot in the adjacent end of the bolt so that the latter is capable of hinging and sliding movement, enlargements on said bolt adapted to engage with the slots in said lugs, a portion appertaining to the door adapted to lie in the gap bridged by the bolt, and a shoulder on the bolt adapted to rest against one of the lugs when said bolt is in its locking position.

6. In a door fastening device, the combination of a lug having an open ended slot of varying width, a bolt, lugs to support a pin which extends through a slot of the bolt for supporting the bolt so as to allow it to turn and slide, and a hinged member movable about the axis of said pin and having a slot therein to engage with the lug, the said hinged member being adapted to lie behind and to be held by the bolt for retaining the door closed.

In testimony whereof I affix my signature in presence of two witnesses.

JAMES BLAKE.

Witnesses:
WALTER J. SKERTEN,
T. SELBY WARDLE.

Copies of this patent may be obtained for five cents each, by addressing the "Commissioner of Patents, Washington, D. C."